United States Patent [19]

Otake

[11] Patent Number: 5,469,032
[45] Date of Patent: Nov. 21, 1995

[54] ELECTRIC MOTOR CONTROL WITH MALFUNCTION DETECTION

[75] Inventor: Shinichi Otake, Okazaki, Japan

[73] Assignee: Aisin AW Co., Ltd., Japan

[21] Appl. No.: 120,383

[22] Filed: Sep. 14, 1993

[30] Foreign Application Priority Data

Sep. 14, 1992 [JP] Japan .................... 4-244772

[51] Int. Cl.$^6$ ..................................... H02P 5/00
[52] U.S. Cl. ..................... 318/439; 361/23; 318/254; 318/603
[58] Field of Search ..................... 318/254, 439, 318/138, 434, 798–815, 601, 603, 605, 618, 139; 361/23; 180/170, 171, 197; 73/118.1

[56] References Cited

U.S. PATENT DOCUMENTS

| | | | |
|---|---|---|---|
| 4,759,212 | 7/1988 | Sawada et al. ....................... | 73/118.1 |
| 4,876,527 | 10/1989 | Oka et al. .............................. | 180/197 X |
| 4,918,443 | 4/1990 | Yoshida et al. ....................... | 318/603 X |
| 4,939,435 | 7/1990 | Takahashi et al. ...................... | 318/432 |
| 4,963,800 | 10/1990 | Kajiwara et al. ....................... | 318/439 X |
| 5,045,763 | 9/1991 | Kobayashi et al. ...................... | 318/270 |
| 5,152,178 | 10/1992 | Kadota .................................. | 73/118.1 |
| 5,241,255 | 8/1993 | Oshima et al. .......................... | 318/801 |
| 5,306,998 | 4/1994 | Nakamura ............................. | 318/806 |
| 5,316,263 | 5/1994 | Mino ..................................... | 318/601 X |

Primary Examiner—Jonathan Wysocki
Attorney, Agent, or Firm—Lorusso & Loud

[57] ABSTRACT

A motor for an electromobile includes a rotor having permanent magnets and a stator coil for generating an output torque when fed with a motor current. A rotor position detector or resolver is connected to the spindle of the rotor for detecting the magnetic position of the rotor in terms of a voltage waveform and a motor controller controls the output current to the motor on the basis of the magnetic position signal coming from the rotor position detector. A first malfunction detecting circuit detects any malfunction of the rotor position detector in response to an abnormal voltage waveform coming from the rotor position detector. A second disconnection detecting circuit detects a disconnection of the motor controller from the invertor which develops drive current for the motor. A control unit outputs a signal to the motor controller for stopping the motor in response to a signal from either the first malfunction detecting circuit or the second disconnection detecting circuit.

3 Claims, 8 Drawing Sheets

FIG. I

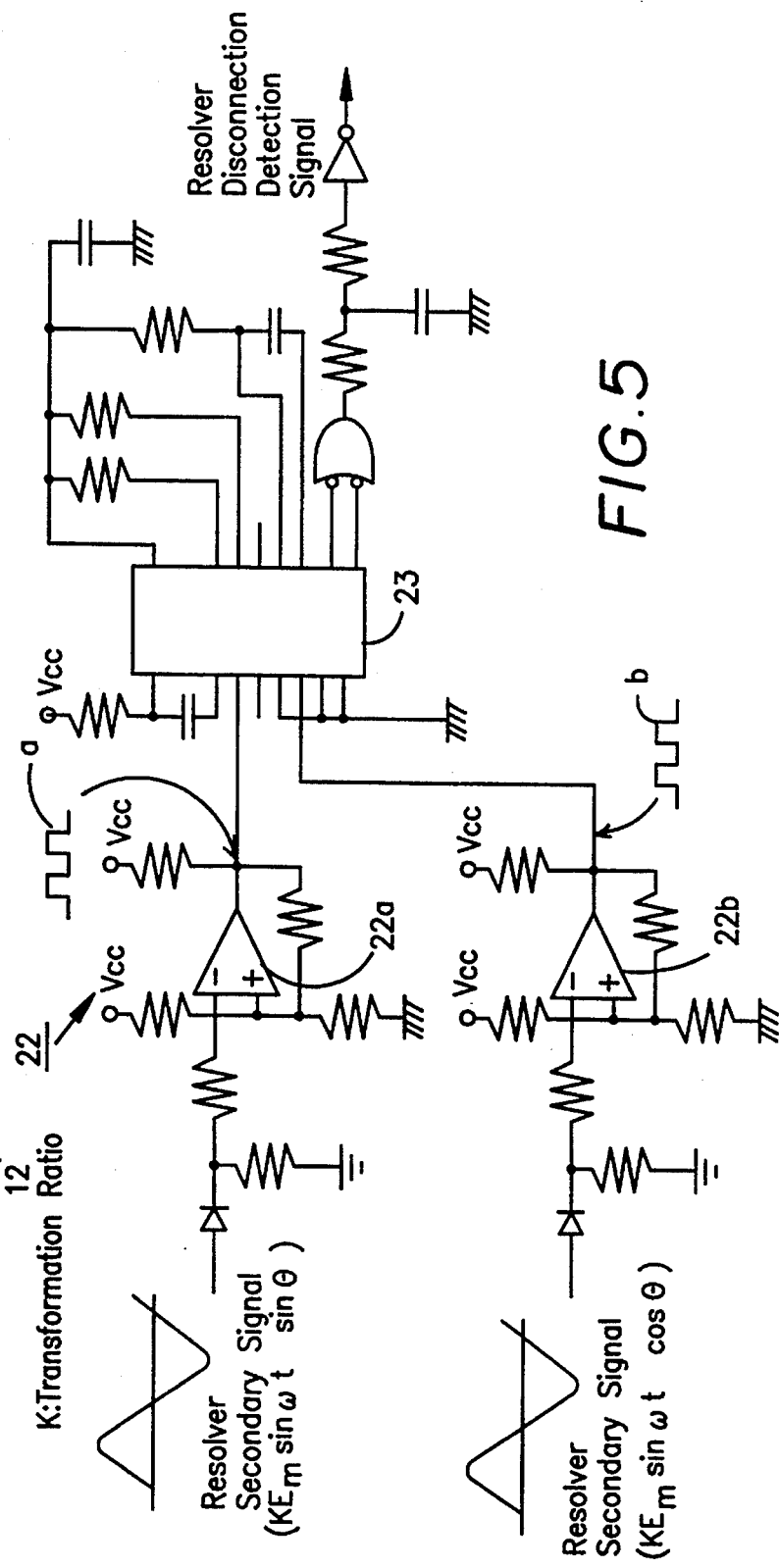

FIG. 6

| Status | Output Signal | Resolver Output | | Comparator Output | | Outputs of Resolver Disconnection Detection Signals |
|---|---|---|---|---|---|---|
| | | sin | cos | 22a | 22b | |
| Normal | | ～ | ～ | ⊓⊔ | ⊓⊔ | ― (H) |
| Primary Disconnection or Exciter Trouble | sin | ― | ― | ― | ⊓⊔ | ― (L) |
| | cos | ～ | ― | ⊓⊔ | ⊓⊔ | ⊓⊔ |
| | both | ― | ― | ⊓⊔ | ⊓⊔ | ⊓⊔ |
| Disconnection secondary | | ― | ― | ― | ― | ― (L) |

Normal / Abnormal

| | | Normal | Disconnection | Short | Normal | Disconnection | Short |
|---|---|---|---|---|---|---|---|
| L | L | L | L | H | L | L | H |
| H | H | H | L | H | L | H | L |
| H | X | H | L | H | L | H | L |

ELECTRIC MOTOR CONTROL WITH MALFUNCTION DETECTION

BACKGROUND OF THE INVENTION

1. Field of the Invention

The present invention relates to a protective system in a brushless DC motor control circuit and more particularly to such protective circuits in electromobiles (electric cars).

2. Description of the Background of the Invention

In a DC motor found in an electromobile of the prior art, current is fed to coils on the rotor through sliding brushes and commutators. It is desirable to eliminate the contact wear and noise associated with these parts.

As a solution to the foregoing problems, electromobiles have been developed in which the aforementioned motor is replaced by a brushless DC motor composed of a rotor having permanent magnets and a stator coil (hereinafter "brushless DC motor"). To control such a brushless DC motor, three-phase sinusoidal waves are generated in a manner corresponding to the magnetic position of the rotor and are multiplied by a current command and fed to a pulse width converting circuit (invertor), in which they are converted into a motor current such as a sinusoidal phase current. This phase current is fed to the stator coil of the brushless DC motor. Moreover, the current is fed back and is controlled by an invertor circuit to match the current command.

However, the brushless DC motor of the prior art requires the detection of the magnetic position of the rotor by means of a magnetic position detector. If the magnetic position detector malfunctions or the motor control circuit is disconnected from the invertor circuit, the phase current cannot be generated in a manner for driving the brushless DC motor in a stable state (e.g., stopping the motor).

SUMMARY OF THE INVENTION

An object of the present invention is to solve the above-specified problems concomitant with the electromobile of the prior art and to provide an electromobile which can detect a malfunction of the magnetic position detector or detect disconnection of the motor control circuit from the invertor circuit so that its brushless DC motor can be stably driven.

In order to achieve the above-specified object, according to the first aspect of the present invention, an electromobile is provided with a motor which includes a rotor having permanent magnets and a stator coil. Rotor position detecting means is connected to the spindle of the rotor for detecting the magnetic position of the rotor in terms of a voltage waveform. A motor controller controls the drive current to the motor on the basis of the magnetic position signal coming from the rotor position detecting means. Any malfunction of the rotor position detecting means is detected by a first resolver malfunction detecting means in response to the voltage waveform coming from the rotor position detecting means. In response to a malfunction signal from the first malfunction detecting means, a control unit outputs a signal for stopping the motor to the motor controller.

In order to achieve the above-specified object, according to the second aspect of the present invention, the above mentioned motor controller outputs pulse-width signals to an invertor circuit which develops the drive current to the motor. Disconnection of the motor controller from the invertor circuit is detected by a second malfunction detecting means in response to the condition of the signals present at the output lines of the motor controller. In response to a malfunction signal from the second disconnection malfunction detecting means, a control unit outputs a signal for stopping the motor to the motor controller.

In short, the rotor position detecting means produces a voltage waveform different from the normal voltage waveform, if the signal line is disconnected or if the exciting circuit malfunctions. This voltage waveform is monitored by the malfunction detecting means so that the malfunction of the rotor position detecting means can be detected and the motor can be driven in a stable state.

BRIEF DESCRIPTION OF THE DRAWINGS

FIG. 4 is a circuit diagram of a resolver;

FIG. 5 is a circuit diagram showing a resolver malfunction detecting unit;

FIG. 6 presents waveform charts of a resolver output, a comparator output and a resolver disconnection detection signal output;

FIG. 8 is a diagram enumerating the functions of the monitor circuit; and

DESCRIPTION OF THE PREFERRED EMBODIMENT

Figure 1:
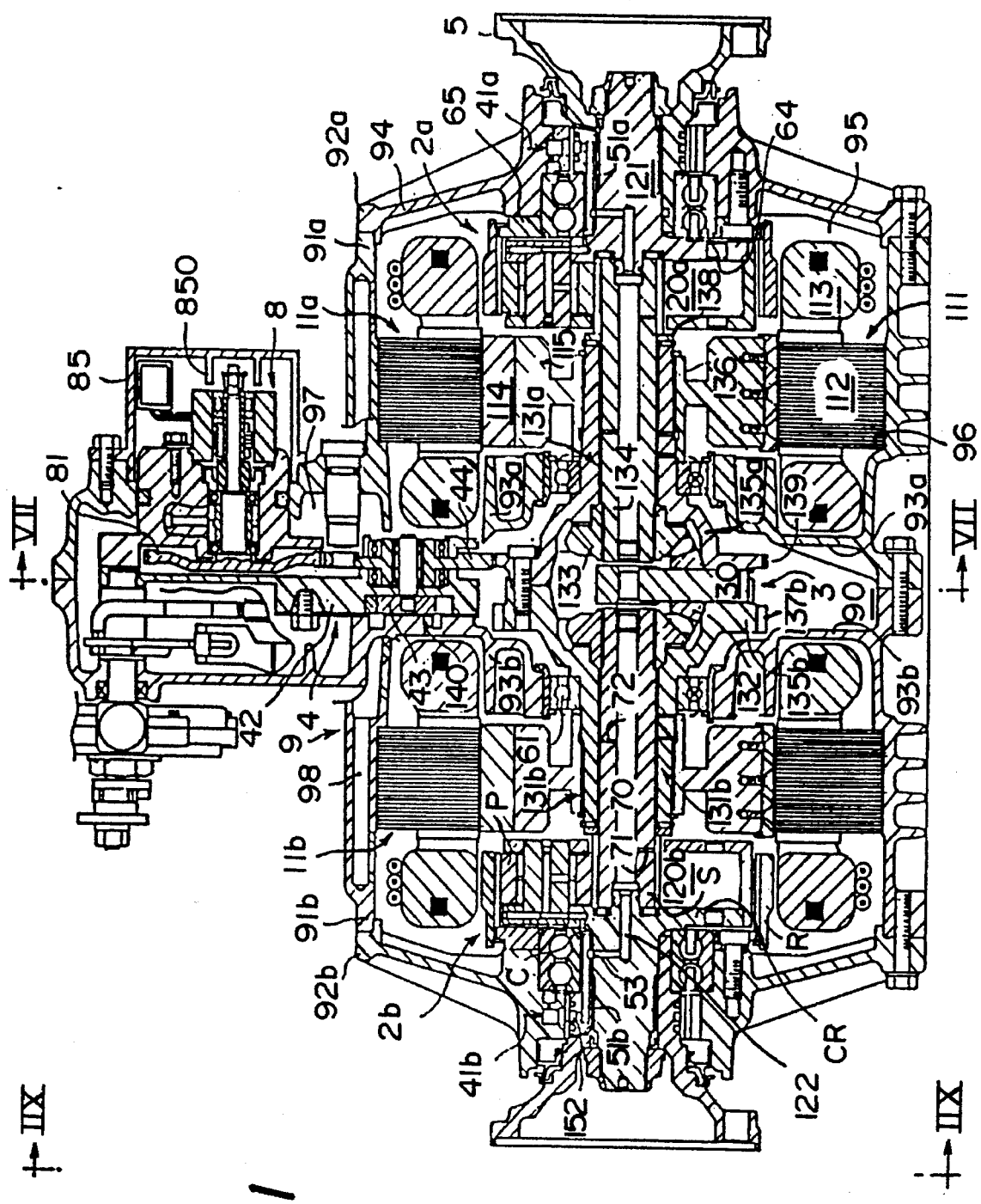
FIG. 1 is a cross-sectional view of an electric vehicle drive unit embodying the present invention.

The invention will now be explained with reference to the preferred embodiment shown in the accompanying drawings. FIG. 1 is a cross-sectional view, taken along the main axis, of an entire electric vehicle drive embodying the present invention. This drive unit is made up of: a drive case 9; a left/right pair of electric motors 11a and 11b mounted coaxially inside the drive case 9; a transmission mechanism made up of a differential device 3, connected to the drive motors 11a and 11b, which transmits the power of the motors to the left and right driving wheels (not shown) of the vehicle, and a pair of gearing-down devices 2a and 2b, connected to the differential device 3, which reduce the speed and increase the torque of the differential drives from the differential 3; an oil circulation system 4, which, with its lower part as an oil reservoir, circulates oil around the case 9; and an oil pump 140 and a resolver 8, driven by the electric motors 1a and 1b via a pump drive gear 44 and a sensor gear 81 respectively. The pump drive gear 44 and the sensor gear 81 are housed in their own dedicated case 42 mounted inside the drive unit case 9.

Because the left and right halves of the drive unit are practically symmetrical about the differential device 3, except where differentiation is especially necessary the reference numerals in FIG. 1 have been abbreviated using 'a' and 'b' to label symmetrically corresponding parts, and, in the description that follows, such symmetrical pairs of will be explained with reference to only one part of the pair.

The various components will now be explained in greater detail. The drive unit case 9 has a pair of open-ended cylindrical center cases 91a, 91b, and these are joined together by bolts. Cap-shaped side cases 92a, 92b are spigot jointed and fastened by bolts onto the open ends of the center cases 91a and 91b. The center cases 91a, 91b are provided with partition walls 93a, 93b extending radially toward the center, and a differential device chamber 90 containing a differential device 3 is mounted between these partition walls.

An electric motor chamber 95 is formed between the partition wall 93 and the end wall 94 of the side case 92, and an electric motor 11 is mounted in this chamber. The stator 111 of the electric motor 11 is fixed to the inner wall of the center case 91. The stator 111 comprises an electromagnetic core 112 and a coil 113, and the inner side of the electromagnetic core 112 (the vicinity where the center cases 91a and 91b join will hereinafter be referred to as 'inner') is in abutment with a step portion 96 formed in the inside surface of the center case 91, and the core 112 is supported and fixed against rotation by the center case 91.

The rotor drum 115 of the rotor 114 of the electric motor 11 is mounted on the differential device 3. The differential device 3 is made up of: a pair of differential cases 131a, 131b, made of a strong material and bolted together so as to form one body; a pinion shaft 130 mounted in the part where the differential cases 131a, 131b join; a pinion 132 mounted rotatably on the pinion shaft 130; and side gear 133 which mesh with the pinion 132. The drive transmitted to the differential case 131 from the rotor 14 is differentially transmitted by the side gears 133 to drive shafts 134 extending to the left and right of the car. The differential case 131 has a cylindrical portion 136 which extends from the main portion 135 and coaxially envelopes the drive shaft 134, and it is this cylindrical portion 136 on which the rotor drum 115 is mounted.

The rotor drum 115 is splined to the cylindrical portion 136, a bearing 61 is mounted between the partition wall 93 and the root portion of the cylindrical portion 136, and the differential device 3 is rotatably mounted and axially positioned by this bearing 61. A suitable clearance is provided between the inner surface of the cylindrical portion 61 and the outer surface of the drive shaft 134 so that the two members are free to rotate relative to one another. Therefore, when the differential device 3 operates, the drive shaft 134 rotates relative to the cylindrical portion 136. Also, a parking gear 137b is formed on the main portion 135b of one side 131b of the differential case 131.

A thrust collar 138 is fitted, in such a way that it is not free to move in the axial direction, onto the drive shaft 134 near the outer end of the drive shaft 134, and abuts against the cylindrical portion 136 through a thrust bearing; and the outer end of the drive shaft 134 abuts with the inner end of a transmission shaft 121, which will be discussed further below, also through a thrust bearing. Therefore, the drive shaft 134 is prevented from moving inward by the differential case 131 and is prevented from moving outward by the bearing 64.

A planetary gear unit 120, part of the gearing-down device 2, is mounted on the outer side, i.e. the wheel side, of the thrust collar 138. The planetary gear unit 120 is made up of a sun gear S, a pinion P which meshes with the sun gear S, a carrier CR on which the pinion gear P is mounted, and a ring gear R which meshes with the pinion gear P. The sun gear S is formed as an integral part of the drive shaft 134, and the ring gear R is fixed by bolts to the side case 92 via a stopping ring 65.

The transmission shaft 121 is linked to the wheel side of the carrier CR. A wheel shaft 5 rotatably mounted in the side case 92 via the bearing 64 is splined to the transmission shaft 121, and the transmission shaft 121 and the bearing shaft 5 are axially held in place in the bearing 64 in the side case 92 by a nut. In the planetary gear unit 120 the drive from the drive gear 134 is inputted into the sun gear S and a geared-down drive is outputted from the carrier CR to the transmission shaft 121 and the wheel shaft 5.

In this drive unit, the oil pump 140 of the oil circulation system 4 is mounted mid-way along the drive unit. A dedicated case 42 which serves as both an oil pump case and a sensor support is mounted in a chamber 97 which projects from the case 9 and is connected to the differential device chamber 90, and the oil pump 140 is mounted in this case 42. The pump gear 43 of this oil pump 140 is linked via a pump drive gear 44 to a gear 139 formed on the outside of the main part 135a of the differential case 131.

Figure 2:
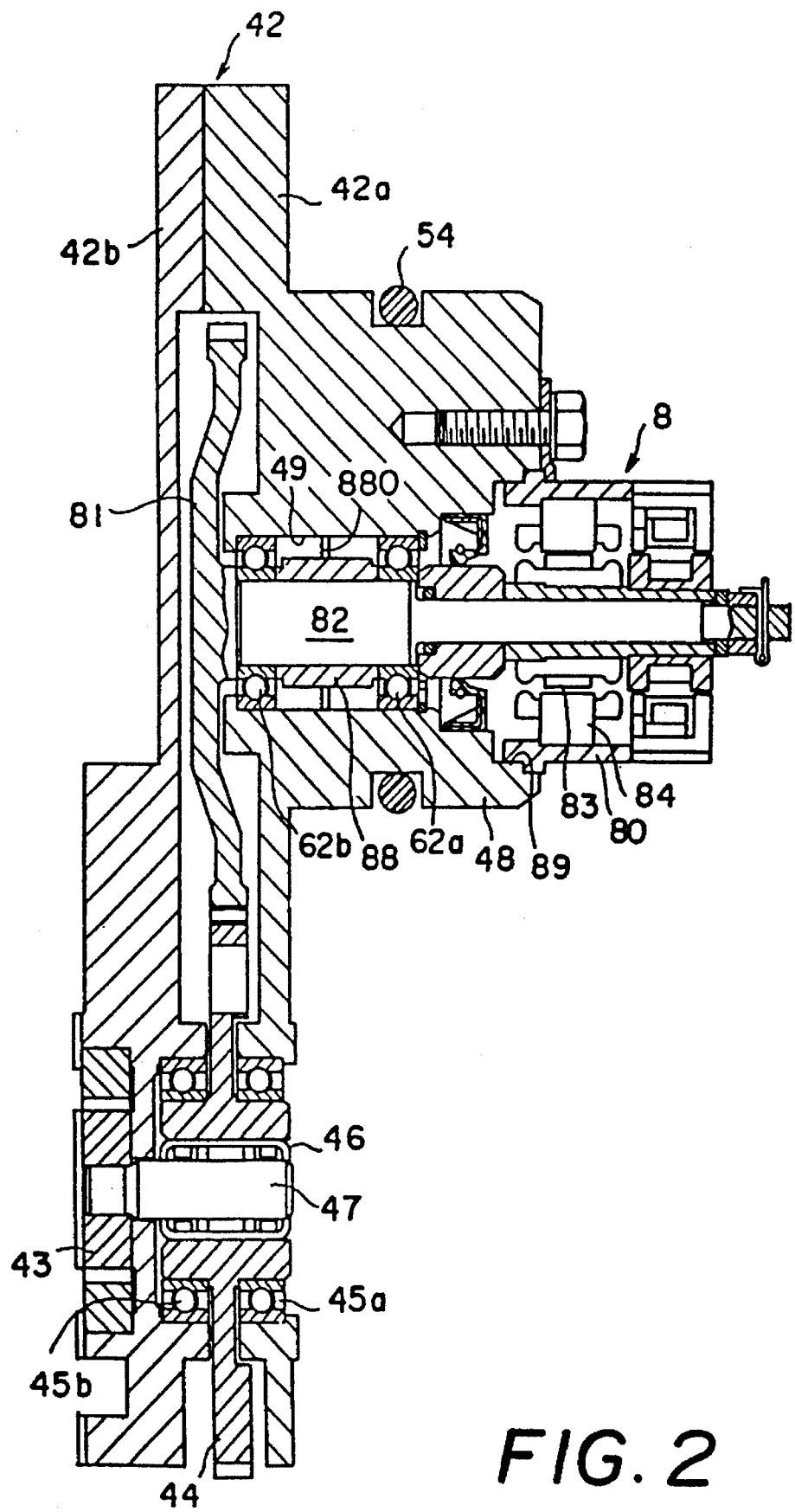
FIG. 2 is a cross-sectional view taken along VII—VII in FIG. 1.

As shown in an enlarged view in FIG. 2, this dedicated case 42 is made up of a case half 42b, which forms the pump case, on the left of the drawing, and a case half 42a, which forms the sensor support, on the right side of the drawing; these two case halves are joined together by bolts, and the pump gear 44 and the sensor gear 81 are housed in a space created where the two case halves join. The pump drive gear 44 is mounted in bearings 45a, 45b, one of which is mounted in each of the case halves, and the pump gear 43 is mounted on the end of a pump shaft 47 linked to the pump drive gear 44 through a one-way clutch for preventing oil reverse flow from occurring during reverse gear rotation.

The sensor gear 81, which meshes with the pump drive gear 44, is supported as a cantilever by a sensor shaft 82 which is an integral extension of the sensor gear 81 and which is supported in a shaft hole 49 in a cylindrical support 48, formed in the case half 42a, by a pair of bearings 62a, 62b. A resolver 8 is fitted to the outer end of the sensor shaft 8. The resolver 8 has a sensor rotor 83 fixed to the sensor shaft 82 through a sleeve, and a resolver stator 84 fixed to the resolver main body 80. An O-ring 54 is fitted in a groove formed in the outer surface of the sensor support 48 and seals the drive unit case where the sensor support passes through it.

A brushless DC motor 11 is provided in each of four drive wheels of an electromobile and is driven by an electric current fed from a DC power source 20, having a voltage of 240 [V], for example. The brushless DC motor 11 includes a rotor composed of six not shown permanent magnets; and a stator coil or an electromagnetic coil composed of three-phase windings.

Figure 3:
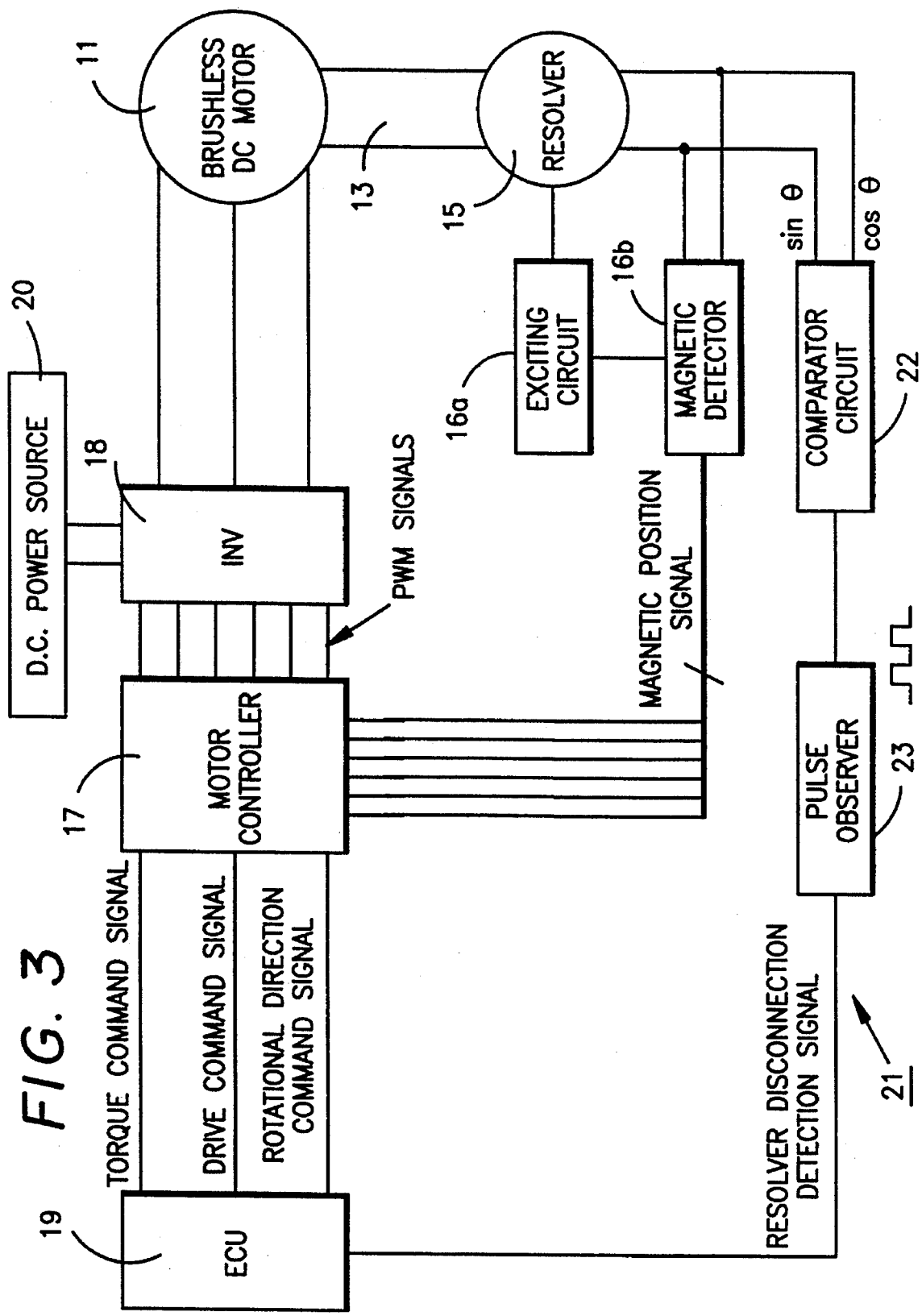
FIG. 3 is a diagram showing a drive circuit in an electromobile according to an embodiment of the present invention.

In FIG. 3 reference numeral 15 designates a resolver acting as rotor position detecting means which has its revolver rotor (not shown) connected coaxially to the rotor shaft 13 of the brushless DC motor 11 so that it can detect the absolute position of the magnetic poles (hereinafter "magnetic position") of the rotor of the brushless DC motor 11.

As shown in FIG. 4, the resolver 15 is equipped at it primary side with a primary winding and at its secondary side with secondary windings which are electrically shifted by a phase of 90 [degrees]. An exciting circuit 16a is connected with the primary winding 10 whereas a magnetic detector 16b (FIG. 3) is connected with the secondary windings 12 and 14. Magnetic detector 16b and comparator circuit 22 receive the same output signals from secondary coils 12 and 14. When a sinusoidal voltage $E_m \cdot \sin w\, t$ produced by the exciting circuit 16a is applied to the primary winding, voltages are individually induced in the secondary windings, which voltages have voltage waveforms expressed by $K \cdot E_m \cdot \sin wt \cdot \cos\theta$ and $KE_m \cdot \sin wt \cdot \cos\theta$. Thus, if the secondary voltages are inputted to the magnetic detector 16b, there can be produced a magnetic position signal indicating the magnetic position in terms of the amplitude ratio of those voltages. This magnetic position signal is outputted to a motor controller 17.

This motor controller 17 is used to form phase current waveforms in accordance with the load condition of the electromobile such as the depression of an accelerator pedal (not-shown) and outputs a pulse-width modulation signal (hereinafter the "PWM signal"), of UVW phases having a pulse width corresponding to a torque command, to an inverter circuit (INV) 18.

The aforementioned brushless DC motor 11 has its stator coil excited by the inverter circuit 18. This inverter circuit 18 is composed of six power transistors (not-shown) and a base drive circuit 35 (FIG. 7) for driving each of the six power transistors. In response to the PWM signal outputted from the motor controller 17, that base drive circuit outputs a switching signal to the bases of the individual power transistors.

Reference numeral 19 designates a main computer (ECU) which receives at its input ports, an acceleration signal output from an acceleration sensor (not shown) and corresponding to the depression of the accelerator pedal; a brake signal output from a brake sensor (not shown) and corresponding to the depression of the brake pedal; a shift position signal corresponding to the range position of the shift lever (not shown); and a speed signal electromagnetically picked up as the rotational speed of the brushless DC motor 11.

On the other hand, the output ports of the main computer 19 output a torque command signal for instructing the torque command, a drive command signal to the brushless DC motor 11, and a rotational direction command signal for instructing the rotational direction to the aforementioned motor controller 17.

With the base circuit thus constructed, when the voltages $K \cdot E_m \cdot \sin wt \cdot \cos\theta$ and $KE_m \cdot \sin wt \cdot \cos\theta$ are induced in the secondary windings of the resolver 15, the magnetic detector 16b detects the magnetic position as the amplitude ratio of those voltages and outputs the magnetic position signal to the motor controller 17.

This motor controller 17 has a memory stored with the three sinusoidal data having their phases shifted by ⅔ π and produces a current waveform composed of sinusoidal digital signals of UVW phases on the basis of the sinusoidal data and the magnetic position signal. The current waveform is transformed into an analog signal and further into an AC signal having its phase and amplitude governed by the torque command signal, the drive command signal and the rotational direction command signal inputted from the main computer 19. The AC signal is differentially amplified with the feedback signal of the phase current so that the PWM signal having its phase and pulse width determined by a comparator circuit (not shown) is output to the inverter circuit 18.

The inverter circuit 18 amplifies the PWM signal by changing the duty ratio of its pulse width and outputs the amplified signal as a phase current of the brushless DC motor 11.

The resolver 15 detects the magnetic position of the brushless DC motor 11 and is indispensable for operation of the brushless DC motor 11. If the resolver 15 has its signal line disconnected or if its exciting circuit 16a malfunctions, the power transistors constituting the inverter circuit 18 go out of control so that the brushless DC motor 11 vibrates abnormally and/or its efficiency drops.

Therefore, the brushless DC motor 11 is stopped if the resolver 15 has its signal line disconnected or its exciting circuit 16a malfunctions.

In order to detect the disconnection or malfunction of the resolver 15, there is provided a resolver malfunction detection unit 21.

Here will be described this resolver malfunction detecting unit 21 with additional reference to FIG. 5.

The resolver malfunction detecting unit 21 includes a comparator circuit 22 connected with the two secondary outputs of the resolver 15; and a pulse observer 23 for observing the output of the comparator circuit 22. The resolver 15 always has its primary side fed with a sinusoidal voltage of a constant period and its secondary side excited with two outputs. Thus, if the waveform of the secondary voltage is monitored, it is possible to detect the disconnection of the signal line of the resolver 15 and the malfunction of the exciting circuit 16a.

Therefore, the voltage waveform at the secondary side is inputted to the zero-crossing comparator circuit 22 to develop logic level pulses as to be read by the computer. That is to say, the secondary voltage waveform having its amplitude and phase varied is transformed into the pulse signal of the logic level. For this operation, the comparator circuit 22 is equipped with comparators 22a and 22b, in which the two output voltages at the secondary side of the resolver 15 are compared with a predetermined voltage (e.g., 0 V in this case) to provide pulse signals a and b of a constant pulse width.

These pulse signals a and b are observed by the pulse observer 23 and output as resolver disconnection detection signals to the main computer 19.

In a normal state, that is, if the signal line is properly connected and if the exciting circuit 16a functions properly, the sine output and cosine outputs of the resolver, i.e., the sinusoidal waveforms $K \cdot E_m \cdot \sin wt \cdot \cos\theta$ and $KE_m \cdot \sin wt \cdot \cos\theta$ are input to the comparator circuit 22, and the pulse signal composed of a pulse train of a constant period is input to the pulse observer 23. As a result, this pulse observer 23 observes that the resolver disconnection detection signal is at the high (H) level, if a pulse is present in a constant period of the signal output from the comparator circuit 22. If the resolver signal line is disconnected or if the exciting circuit 16a malfunctions, the signal output from the comparator circuit 22 may contain no pulse. Then, it is decided that the resolver signal line is disconnected or that the exciting circuit has malfunctioned, and the resolver disconnection detection signal at the low (L) level is output to the main computer 19.

Main computer 19 constantly monitors the resolver disconnection detection signal coming from the pulse observer 23. If the resolver disconnection detection signal at the low (L) level is output from the pulse observer 23, the drive command signal output to the motor controller 17b is turned OFF so no PWM signal is output to the inverter circuit 18.

Thus, the brushless DC motor 11 can be safely stopped.

As has been described above, the inverter circuit 18 is equipped with a base drive circuit 50 for driving each of the power transistors, and this base drive circuit 50 outputs the switching signal to the individual bases of the power transistors in response to the PWM signal coming from the motor controller 17.

However, if the signal lines feeding the PWM signal and the switching signal are disconnected, the brushless DC motor 11 goes out of control so that an abnormal vibration occurs. Therefore, the motor controller 17 is equipped with a monitor circuit for detecting the disconnection.

Figure 7:
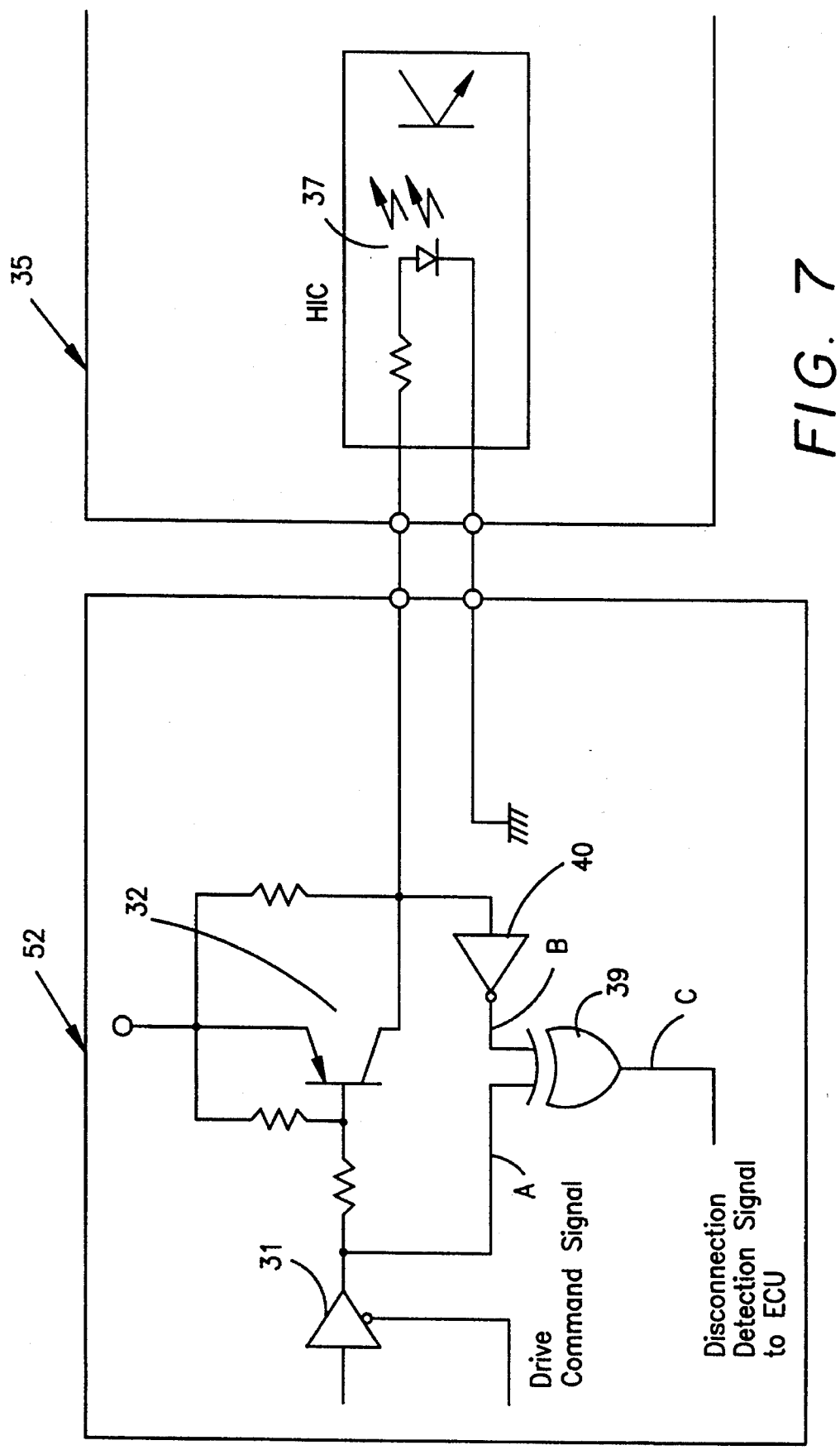
FIG. 7 is a diagram showing a motor driving circuit equipped with the monitor circuit.

In FIG. 7 reference numeral 52 designates a circuit for outputting a PWM signal to one of the base drive circuits 50. Thus, the motor controller 19 includes six output circuits 52. Numeral 31 designates a three-state IC of an active low control input having an input terminal fed with the PWM signal and its control input terminal fed with an active low drive command signal. A transistor 32 has its base connected with the output terminal of the three-state IC 31.

Moreover, the three-state IC 31 has its input and output sides connected, when its control input terminal is fed with the active low drive command signal, so that the high level (hereinafter "H") and the low level (hereinafter "L") of the PWM signal are output as they are to the output terminal. As a result, the transistor 32 is turned ON when the PWM signal is at "H".

This transistor 32 has its output side connected with a photo-coupler 37 of a hybrid IC (HIC) in a base drive circuit 35 so that the photo-coupler 37 may be turned ON when the transistor 32 is turned ON. This photo-coupler 37 is connected with the power transistor (not shown) in the base drive circuit 35 so that the power transistor is turned ON/OFF in response to the "H" or "L" of the PWM signal. Incidentally, the photo-coupler 37 is arranged to isolate the inside of the motor controller 17 electrically from the power transistor.

The aforementioned monitor circuit is connected between the input side and output side of the transistor 32 and is constructed of an exclusive OR gate 39 and an inverter circuit 40. This inverter circuit 40 is connected with the collector of the transistor 32 and has its output side is connected together with the output side of the three-state IC 31 with the input side of the exclusive OR gate 39. Thus, the disconnection detection signal is output from the output side of the exclusive OR gate 39 to the main computer 19 (as shown in FIG. 3) upon failure of the PWM connection between output circuit 52 and base drive circuit 50. Thus, each of the six base drive circuits of inverter 35 will have a corresponding disconnection detector in motor controller 17, i.e. an exclusive OR gate 39.

In FIG. 8 reference letter P designates the PWM signal; letter A signal at the input side of the transistor 32; letter B a signal at the output side of the transistor 32; and letter C a disconnection detection signal at the output side of the exclusive OR gate 39. On the other hand, reference symbol X indicates that the drive command signal or the control input of the three-state IC 31 is OFF to isolate the input side and output side of the three-state IC 31.

Moreover, the level of the disconnection detection signal C is confirmed before the brushless DC motor 11 is driven. In this state, the drive command signal is OFF, and the three-state IC 31 has its input side and output side isolated. If the signal line of the motor controller 17 is normal so that the disconnection detection signal C is at "C", the drive command signal is turned ON to start the switching of the power transistor.

If the signal line of the motor controller 17 is disconnected so that the disconnection detection signal C is at "H", the brushless DC motor 11 does not drive, indicating that the signal line is disconnected.

While the brushless DC motor 11 is being driven, the disconnection detection signal C is constantly monitored. If the signal line is normal, the disconnection detection signal C is at "L". If the signal line is disconnected or short-circuited, the disconnection detection signal C becomes a pulse output in response to the PWM signal. Thus, the main computer 19 turns OFF the drive command signal of the brushless DC motor 11, instantly as it detects the pulse output of the disconnection detection signal C, to idle the DC motor 11 and to indicate that the signal line is disconnected.

Figure 9:
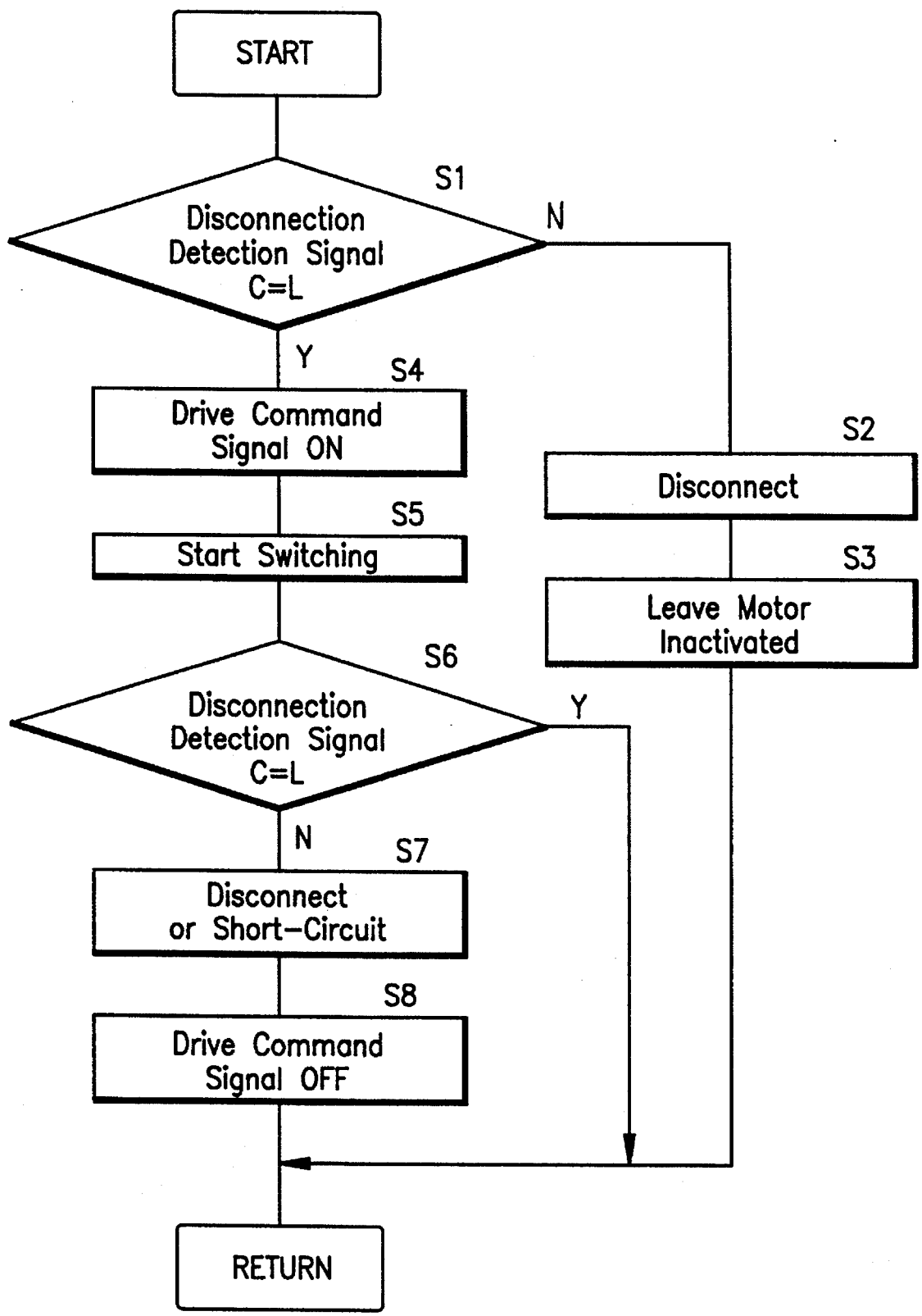
FIG. 9 is a flow chart showing the operations of the monitor circuit of FIG. 7.

The control functions of the monitor circuit of FIG. 7 will now be explained with reference to the flow chart of FIG. 9.

Step S1:
Before sending current to the brushless DC motor 11, it is decided whether the disconnection detection signal C is at "L" or "H". The routine advances to Step S4, if at "L", but to Step S2 if at "H".

Steps S2 and S3:
It is decided that the signal line is disconnected, and the brushless DC motor 11 is left inactivated.

Step S4:
The drive command signal is turned ON.

Step S5
The switching of the power transistor is started.

Step S6:
During operation of the brushless DC motor 11, it is decided whether or not the disconnection detection signal C is at "L". This detection signal C is always at "L" if the signal line of the motor controller 17 is normal. The routine advances to Step S7 if the signal C is not at "L".

Step S7:
It is decided that the signal line is disconnected or short-circuited.

Step S8:
The drive command signal is turned OFF.

Incidentally, the present invention should not be limited to the foregoing embodiment but can be modified in various manners without departing from the gist thereof, and these modifications should not be excluded from the scope of the present invention.

What is claimed is:

1. An electric motor having a control with malfunction detection comprising:

a motor including a rotor having permanent magnets and a stator coil energizable by a multiphase current for generating an output torque when fed with a motor current;

rotor position detecting means connected to the spindle of said rotor for detecting the magnetic position of said rotor and for generating a voltage waveform characterizing the detected magnetic position;

a motor controller for controlling the multiphase current to said motor stator coil on the basis of the magnetic position waveform from said rotor position detecting means;

a comparator circuit for comparing the magnetic position waveform with a predetermined voltage and for outputting a pulse signal in accordance with the comparison;

a pulse observing circuit for observing the pulse signal from said comparitor circuit and for outputting a malfunction signal if said pulse signal contains no pulse in a constant period; and a control unit for outputting a signal to said motor controller for stopping said multiphase current to said motor stator coil in response to the malfunction signal from said pulse observing circuit.

2. An electric motor having a control with malfunction detection according to claim 1, wherein said rotor position detecting means generates two voltage waveforms which characterize the detected magnetic position;

said comparator circuit receives the two waveforms from said rotor position detecting means, compares each of the waveforms with the predetermined voltage and outputs two pulse signals in accordance with the respective comparisons; and said pulse observing circuit outputs a malfunction signal if either of the two pulse signals outputted from said comparator circuit contains no pulse in a constant period.

3. A motor control circuit for an electric motor including a motor rotor having a motor spindle with permanent magnets, and a motor stator coil energizable by a multiphase motor current for generating a output torque on the motor spindle, the control circuit comprising:

rotor position detecting means including (a) an exciting circuit for outputting a predetermined exciting AC voltage, and (b) a resolver having a resolver rotor connected to the motor spindle and a resolver stator wherein said resolver rotor and said resolver stator include a primary winding for receiving the exciting AC voltage and a pair of secondary windings for outputting respective AC voltage waveforms indicating the rotative position of said resolver rotor which in turn indicates a magnetic position of said motor rotor;

a magnetic detector for detecting the AC voltage waveforms from the secondary windings and outputting a magnetic position signal;

a motor controller for controlling the multiphase motor current to said motor stator coil on the basis of the magnetic position signal from said magnetic detector;

a comparator circuit for comparing the AC voltage waveforms from the secondary windings with a predetermined voltage and for outputting respective pulse signals in accordance with the comparison;

a pulse observing circuit for observing the pulse signals from said comparitor circuit and for outputting a resolver disconnection detection signal if at least one of said pulse signals contain no pulse in a constant period; and a control unit for outputting a signal to said motor controller for stopping said multiphase current to said motor stator coil in response to the resolver disconnection detection signal from said pulse observing circuit.

* * * * *